US010191872B2

(12) United States Patent
Hase et al.

(10) Patent No.: US 10,191,872 B2
(45) Date of Patent: Jan. 29, 2019

(54) SEMICONDUCTOR DEVICE AND CONTROL METHOD OF SEMICONDUCTOR DEVICE

(71) Applicant: Renesas Electronics Corporation, Tokyo (JP)

(72) Inventors: Masaru Hase, Tokyo (JP); Tetsuji Tsuda, Tokyo (JP); Naohiro Nishikawa, Tokyo (JP); Yuki Inoue, Tokyo (JP); Seiji Mochizuki, Tokyo (JP); Katsushige Matsubara, Tokyo (JP); Ren Imaoka, Tokyo (JP)

(73) Assignee: Renesas Electronics Corporation, Koutou-ku, Tokyo (JP)

( * ) Notice: Subject to any disclaimer, the term of this patent is extended or adjusted under 35 U.S.C. 154(b) by 144 days.

(21) Appl. No.: 15/357,212

(22) Filed: Nov. 21, 2016

(65) Prior Publication Data
US 2017/0161219 A1  Jun. 8, 2017

(30) Foreign Application Priority Data
Dec. 2, 2015  (JP) ................................. 2015-235387

(51) Int. Cl.
*G06F 13/362*  (2006.01)
*G06F 13/40*  (2006.01)
(Continued)

(52) U.S. Cl.
CPC ........ *G06F 13/362* (2013.01); *G06F 13/4022* (2013.01); *G06F 15/17312* (2013.01); *G06F 15/7807* (2013.01)

(58) Field of Classification Search
None
See application file for complete search history.

(56) References Cited

U.S. PATENT DOCUMENTS

| 5,872,939 A * | 2/1999 | Ramsey ................ G06F 13/364 |
| | | 710/120 |
| 2005/0044321 A1 * | 2/2005 | Bialkowski ........... G06F 12/084 |
| | | 711/118 |

(Continued)

FOREIGN PATENT DOCUMENTS

| JP | 2010-140290 A | 6/2010 |
| JP | 2011-232956 A | 11/2011 |

OTHER PUBLICATIONS

Communication dated Apr. 21, 2017 issued by the European Patent Office in counterpart European Application No. 16194438.4.

*Primary Examiner* — Henry Tsai
*Assistant Examiner* — Dean Phan
(74) *Attorney, Agent, or Firm* — Sughrue Mion, PLLC

(57) ABSTRACT

In a semiconductor device, a load of CPU required for arbitration when using a shared resource is reduced.

The semiconductor device includes a CPU section and a hardware IP. In the CPU section, software modules are executed. The hardware IP includes a storage unit, an arbitration unit, and a calculation unit. The storage unit includes control receiving units that receive operation requests transmitted by the software modules, respectively. The calculation unit performs processing based on an operation request transmitted from the control receiving units. The arbitration unit controls information transmission between the control receiving units and the calculation unit so that the calculation unit receives only an operation request from any one of the control receiving units.

21 Claims, 8 Drawing Sheets

(51) Int. Cl.
*G06F 15/173* (2006.01)
*G06F 15/78* (2006.01)

(56) References Cited

U.S. PATENT DOCUMENTS

| | | |
|---|---|---|
| 2007/0126474 A1 | 6/2007 | Chang et al. |
| 2008/0320193 A1 | 12/2008 | Murata |
| 2009/0144480 A1 | 6/2009 | Cho et al. |
| 2011/0246694 A1 | 10/2011 | Ichinose |
| 2011/0265093 A1 | 10/2011 | Nakahara et al. |
| 2011/0320660 A1* | 12/2011 | Hara .................... G06F 13/362 710/114 |
| 2012/0124260 A1 | 5/2012 | Kothamasu |

* cited by examiner

SEMICONDUCTOR DEVICE AND CONTROL METHOD OF SEMICONDUCTOR DEVICE

CROSS-REFERENCE TO RELATED APPLICATIONS

The disclosure of Japanese Patent Application No. 2015-235387 filed on Dec. 2, 2015 including the specification, drawings and abstract is incorporated herein by reference in its entirety.

BACKGROUND

The present invention relates to a semiconductor device and a control method of a semiconductor device.

An SoC (System-on-a-chip) is a semiconductor chip in which a plurality of functions are integrated. The SoC includes a plurality of CPUs. In the SoC, a plurality of applications are performed at the same time. In recent years, upsizing of the SoC is advanced by performance improvement of a system on which the SoC is mounted.

In the SoC, an operation request to a hardware IP (Intellectual Property) of the semiconductor chip may be received from a plurality of applications at the same time. The hardware IP is partial circuit information collected for each function to form the semiconductor chip and information implemented by hardware. In this case, it is necessary to arbitrate operation requests conflicting with each other in order to avoid malfunction and the like.

As a method of such arbitration, a method that arbitrates operation requests conflicting with each other by software processing is proposed (Japanese Unexamined Patent Application Publication No. 2010-140290). In this method, priorities are adjusted by performing communication between a plurality of CPUs and a shared resource is used based on a result of the adjustment.

Another method that arbitrates operation requests conflicting with each other by software processing is also proposed (Japanese Unexamined Patent Application Publication No. 2011-232956). In this method, an operating system and/or an application (software) perform semaphore management, so that the right of use of shared resource is acquired.

SUMMARY

However, the inventors found that the arbitration methods as described above have a problem described below. In the arbitration methods described above, to acquire a privilege to use a shared resource, it is necessary to perform arbitration processing by communication between CPUs and communication between an operating system and an application (software). Therefore, a response of the arbitration processing depends on CPU throughput, the operating system, and the application (software). As the speed of the hardware IP of semiconductor device increases, the response frequency of software increases and a load applied to CPU also increases. Therefore, it is difficult to realize response performance of the arbitration processing by software.

Other objects and novel features will become apparent from the description of the present specification and the accompanying drawings.

According to an embodiment, a semiconductor device includes a CPU section in which a plurality of software modules are executed and a hardware IP. The hardware IP includes a first storage unit including a plurality of control receiving units that receive operation requests of the plurality of software modules, a calculation unit that performs processing based on an operation request, and an arbitration unit that controls information transmission between the plurality of control receiving units and the calculation unit so that the calculation unit receives only one operation request.

According to an embodiment, in a semiconductor device that includes a CPU section in which a plurality of software modules are executed and a hardware IP, a control method of the semiconductor device controls information transmission between a plurality of control receiving units included in a first storage unit of the hardware IP and a calculation unit of the hardware IP so that the calculation unit receives only an operation request from any one of the plurality of control receiving units that receive operation requests of the plurality of software modules.

According to an embodiment, it is possible to reduce a load of CPU required for arbitration when using a shared resource in a semiconductor device.

DETAILED DESCRIPTION

Hereinafter, embodiments of the present invention will be described with reference to the drawings. In each drawing, the same components are denoted by the same reference symbols and redundant description is omitted as appropriate.

First Embodiment

Figure 1:
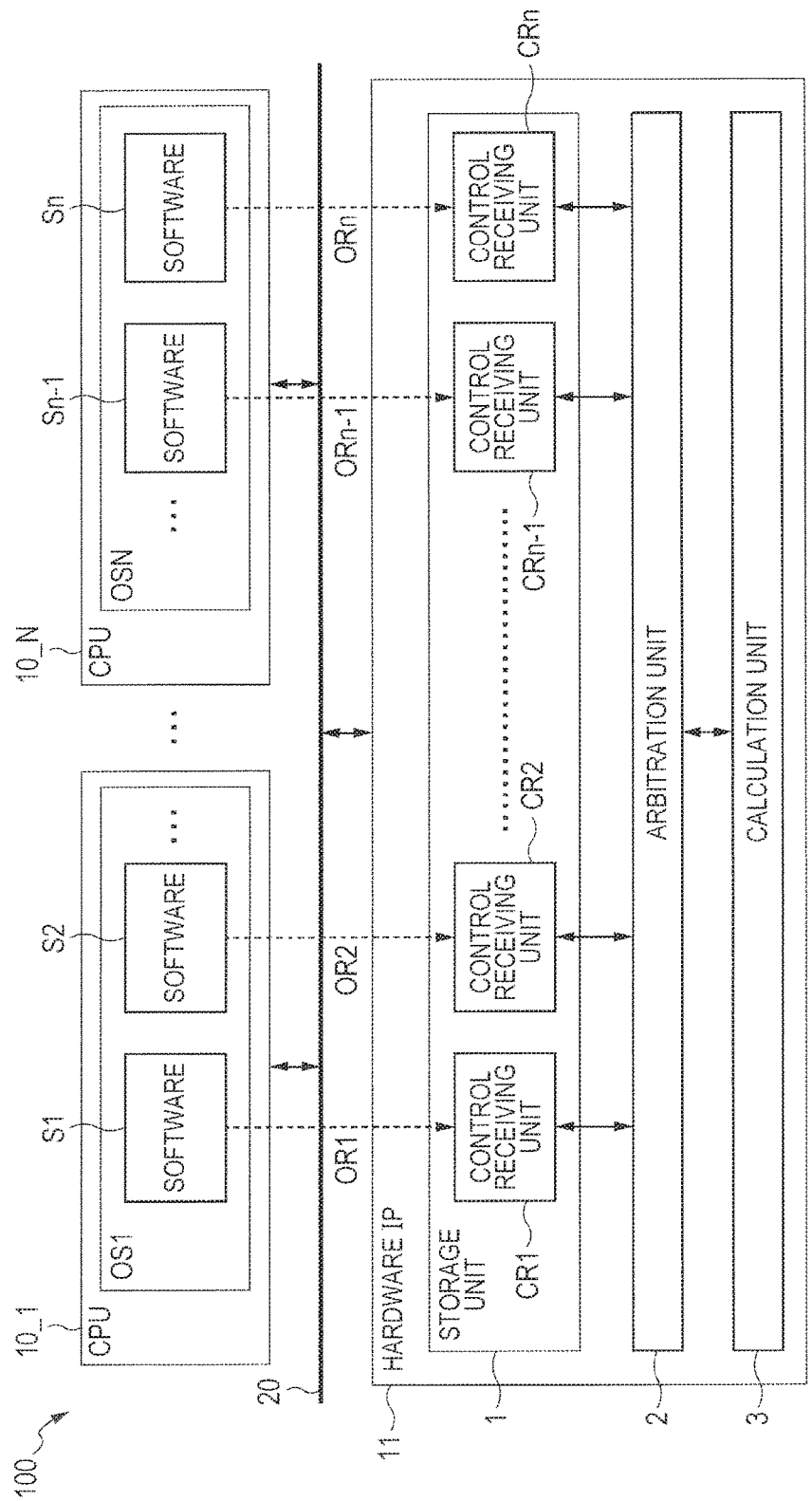
FIG. 1 is a block diagram schematically showing a hardware configuration of a semiconductor device according to a first embodiment.

A semiconductor device 100 according to a first embodiment will be described. FIG. 1 is a block diagram schematically showing a hardware configuration of the semiconductor device 100 according to the first embodiment. The semiconductor device 100 includes CPUs (Central Processing Units) 10_1 to 10_N (N is an integer greater than or equal to 2) and a hardware IP (Intellectual Property) 11. The CPUs 10_1 to 10_N and the hardware IP 11 can transmit and receive information to and from each other through a bus 20.

The CPUs 10_1 to 10_N are configured to be able to execute a predetermined operating system. The operating system may be executed by any one of the CPUs 10_1 to 10_N or may be executed by a plurality of CPUs. This example shows that operating systems OS_1 to OS_N are executed by the CPUs 10_1 to 10_N, respectively. Hereinafter, for simplifying the description, the CPUs 10_1 to 10_N are also referred to as a CPU section 10.

In each operating system, one or a plurality of software modules are executed. Here, it is assumed that software modules S1 to Sn are executed by the CPUs 10_1 to 10_N (that is, operating systems OS_1 to OS_N), respectively.

The hardware IP 11 includes a storage unit 1, an arbitration unit 2, and a calculation unit 3. The storage unit 1 is provided with control receiving units CR1 to CRn respectively corresponding to the software modules S1 to Sn to be executed. Each of the control receiving units CR1 to CRn includes, for example, an independent register. In other words, the control receiving units CR1 to CRn have one-to-one correspondence relationship with the software modules S1 to Sn, respectively, without overlapping. In other words, a control receiving units CRi (i is an integer that satisfies 1≤i≤n) receives an operation request from only a software module Si and transmits information in the control receiving units CRi to only the software module Si.

The arbitration unit 2 controls exchange of information (information transmission) between the control receiving units CR1 to CRn and the calculation unit 3 so that only an operation request from any one of the control receiving units CR1 to CRn is transmitted to the calculation unit 3. Further, the arbitration unit 2 controls exchange of information (information transmission) between the control receiving units CR1 to CRn and the calculation unit 3 so that information (response information) generated as a result of an operation, which is performed by the calculation unit 3 according to the received operation request, is transmitted to the control receiving unit that has outputted the operation request.

The calculation unit 3 is a shared resource shared by the CPUs 10_1 to 10_N. The calculation unit 3 performs processing according to an operation request from software.

Figure 2:
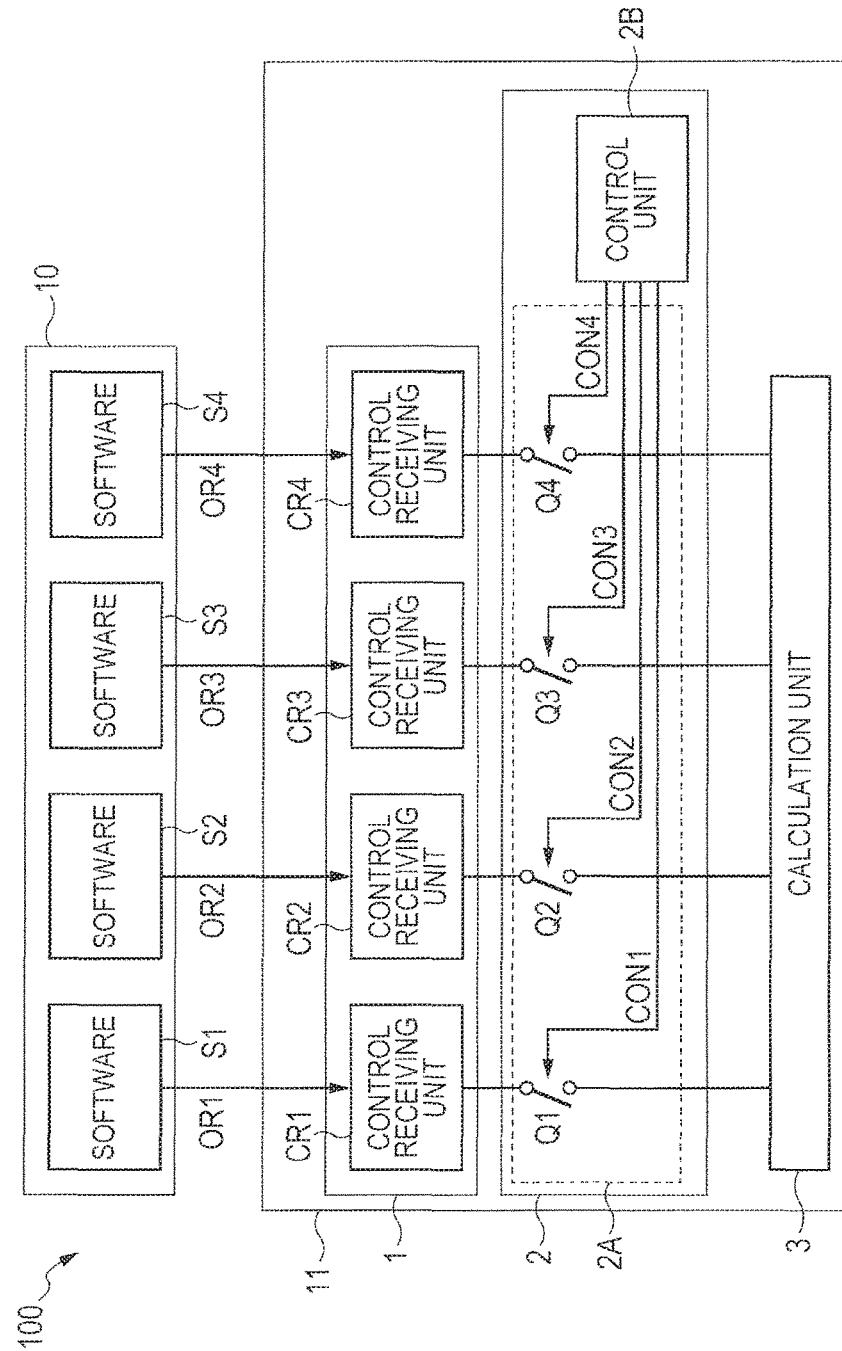
FIG. 2 is a block diagram schematically showing a configuration of the semiconductor device according to the first embodiment.

Hereinafter, an arbitration operation of operation requests in the semiconductor device 100 will be specifically described. Here, for simplifying the description, an example will be described in which four software modules S1 to S4 operate and four control receiving units CR1 to CR4 corresponding to the four software modules S1 to S4 are provided in the semiconductor device 100. FIG. 2 is a block diagram schematically showing a configuration of the semiconductor device 100 according to the first embodiment. For simplifying the drawing, an operating system and a bus are not shown in FIG. 2.

First, the software modules S1 to S4 transmit operation requests OR1 to OR4 to the control receiving units CR1 to CR4, respectively, at the same time or at close timings. The control receiving units CR1 to CR4 hold the received operation requests OR1 to OR4, respectively.

The arbitration unit 2 selects an operation request to be transferred to the calculation unit 3 from among the operation requests held by the control receiving units CR1 to CR4 according to a set arbitration method. For example, the arbitration unit 2 can apply an arbitration method such as round robin and LRU (Least Recently Used) as the arbitration method. The arbitration unit 2 may randomly select a control receiving unit.

The arbitration unit 2 operates so that an operation request held by the selected control receiving unit is transmitted to the calculation unit 3 according to the set arbitration method.

As shown in FIG. 2, the arbitration unit 2 includes a switching circuit 2A (also referred to as a first switching circuit) and a control unit 2B. The switching circuit 2A includes switching elements Q1 to Q4. The switching element Q1 may be formed by a transistor such as a MOSFET (Metal-Oxide-Semiconductor Field-Effect Transistor) and a bipolar transistor. In this example, the switching elements Q1 to Q4 are inserted between the control receiving units CR1 to CR4 and the calculation unit 3, respectively.

The control unit 2B controls open/close (on/off) of the switching elements Q1 to Q4 by control signals CON1 to CON4. For example, when the switching elements Q1 to Q4 are MOSFETs, the control unit 2B controls open/close (on/off) of the switching elements Q1 to Q4 by applying gate voltages (that is, control signals CON1 to CON4) to gates (control terminals) of the switching elements Q1 to Q4. In the present embodiment, the control unit 2B controls the switching elements Q1 to Q4 so that only one of the switching elements Q1 to Q4 is closed (becomes on).

Figure 3:
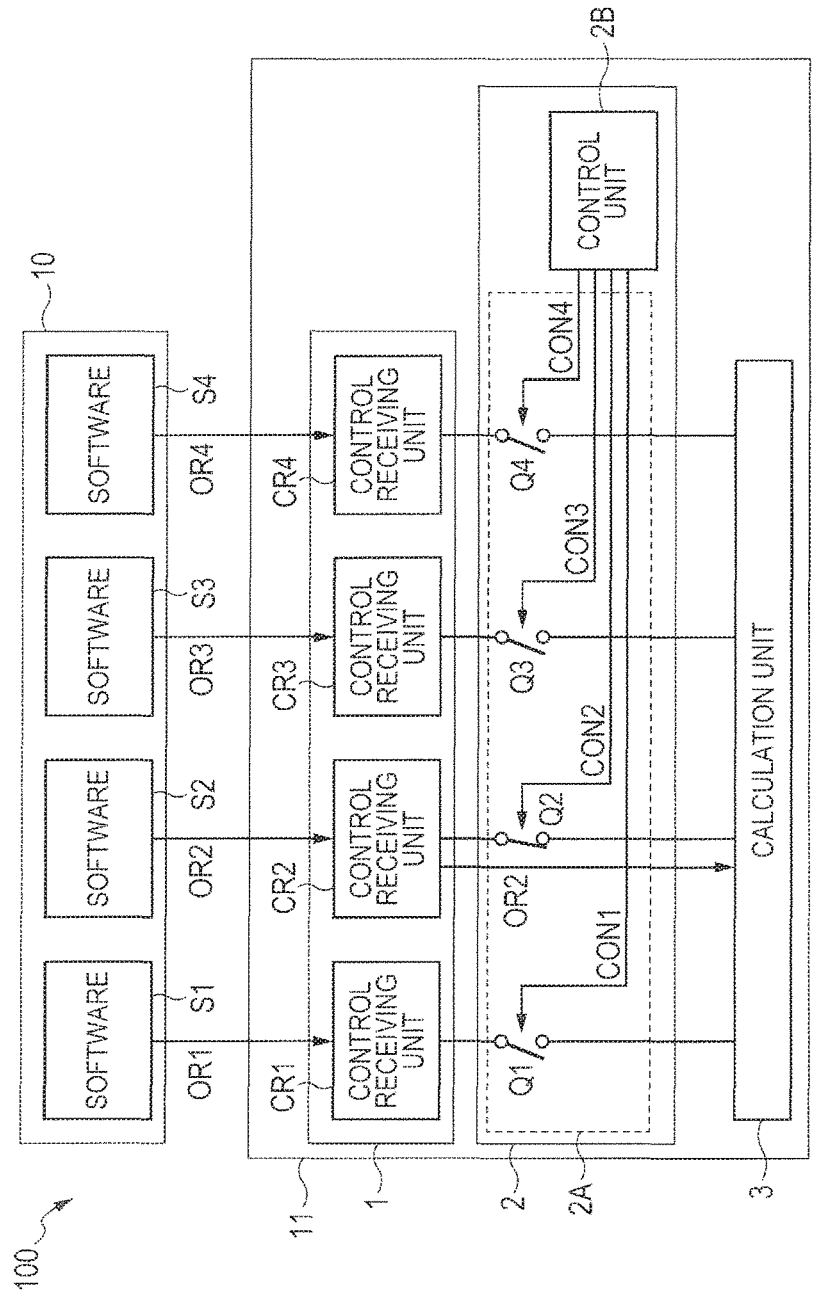
FIG. 3 is a block diagram showing an arbitration operation in the semiconductor device according to the first embodiment.

The control unit 2B selects a control receiving unit to which an operation request is transmitted according to the set arbitration method described above. Here, a case will be described in which the control receiving unit CR2 is selected as the control receiving unit to which an operation request is transmitted. FIG. 3 is a block diagram showing the arbitration operation in the semiconductor device 100 according to the first embodiment. For simplifying the drawing, an operating system and a bus are not shown in FIG. 3. In this case, as shown in FIG. 3, the control unit 2B closes the switching element Q2 (causes the switching element Q2 to be on) and opens the switching elements Q1, Q3, and Q4 (causes the switching elements Q1, Q3, and Q4 to be off). Thereby, the control receiving unit CR2 and the calculation unit 3 are coupled to each other.

In this state, the control receiving unit CR2 outputs the held operation request OR2 to the calculation unit 3. The calculation unit 3 performs processing according to the received operation request OR2. In this case, the switching elements Q1, Q3, and Q4 are physically separated from the calculation unit 3, so that the calculation unit 3 can reliably perform the processing according to the operation request OR2. As described above, according to the present configuration, it is possible to arbitrate the operation requests from the control receiving units CR1 to CR4 and transmit only any one of the operation requests to the calculation unit 3.

Figure 4:
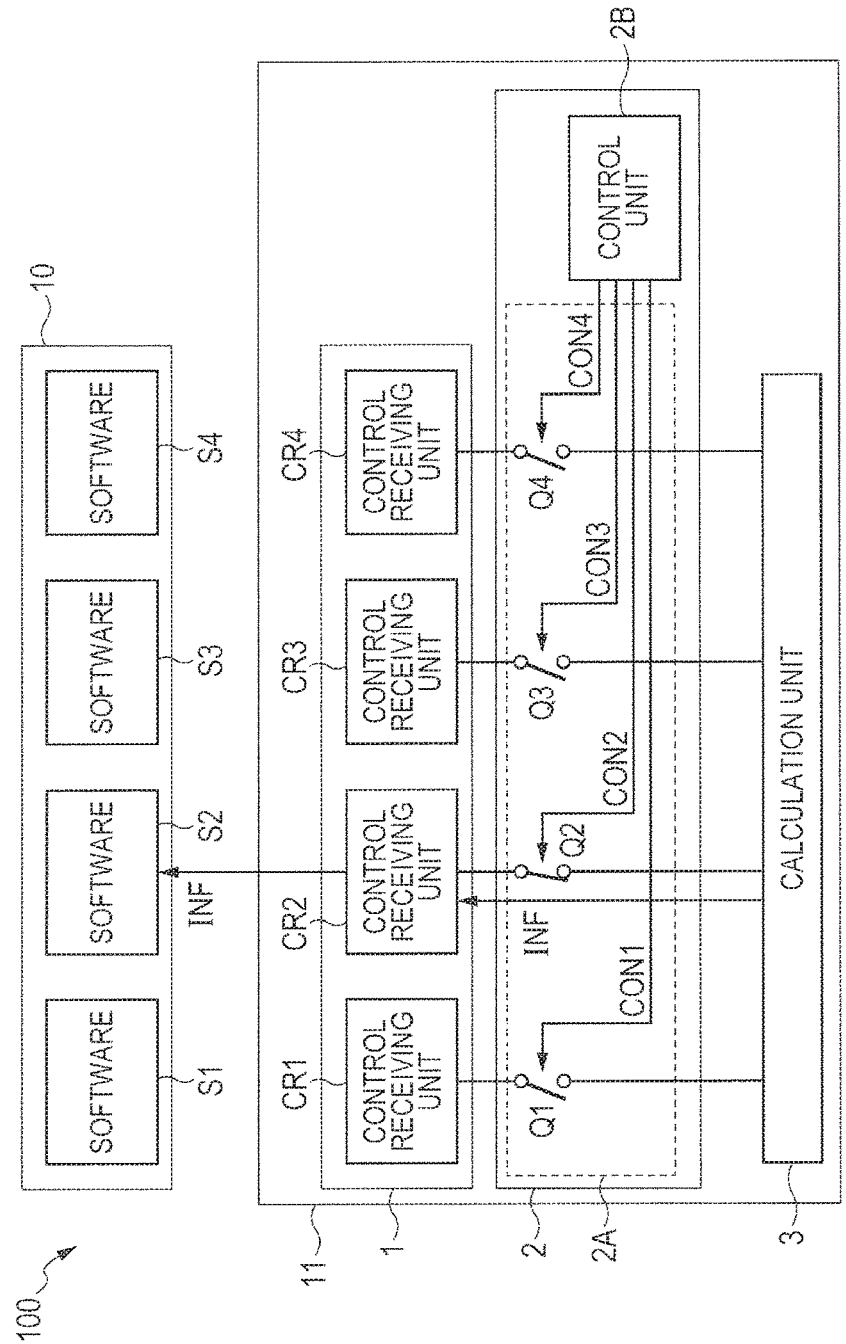
FIG. 4 is a block diagram showing a response operation of a calculation unit of the semiconductor device according to the first embodiment.

After the calculation unit 3 performs the processing according to the received operation request OR2, the calculation unit 3 may transmit information generated as a result of the performed processing to the control receiving unit CR2 that has transmitted the operation request OR2 (hereinafter, this is referred to as a response operation of the calculation unit). FIG. 4 is a block diagram showing the response operation of the calculation unit 3 of the semiconductor device 100 according to the first embodiment. For simplifying the drawing, an operating system and a bus are not shown in FIG. 4. For example, in the response operation, the calculation unit 3 may transmit a processing completion notification and information generated as a result of the performed processing such as information indicating the load of the calculation unit 3 as response information INF.

As described above, according to the present configuration, the arbitration of the operation requests is performed in the hardware IP, so that the CPU need not perform software processing, and thereby it is possible to reduce the load of the CPU. The control receiving units corresponding to the software modules executed by the CPU are provided in the hardware IP, so that the CPU can sequentially output operation requests from the software modules. As a result, it can be understood that operation requests to be transmitted are not accumulated in the CPU and the load of the CPU can be further reduced.

Further, the present configuration is advantageous from a viewpoint of functional safety. Hereinafter, the reason of the above will be described. The operation requests OR1 to ORn of the software modules S1 to Sn are transmitted to the control receiving units CR1 to CRn dedicatedly provided, respectively. Therefore, each operation request can reach the calculation unit 3 without interfering or intersecting with the other operation requests. Thus, by providing the control receiving units exclusively and respectively corresponding to the software modules S1 to Sn from a viewpoint of securing functional safety of the software modules, it is possible to secure the functional safety of the software modules.

It is possible to mount the semiconductor device 100 described above in an in-vehicle terminal such as a car navigation system. For example, in the car navigation system, each of a terrestrial digital broadcasting reproduction application and a DVD/BD (Digital Versatile Disc/Blue-ray Disc) (registered trademark) reproduction application independently issues an operation request to a video/audio decoder IP (Intellectual Property). At this time, even if an operation request is issued from both the applications, arbitration processing can be performed in the hardware IP 11 of the semiconductor device 100. When assuming a case in which driving control is performed by using a driving support function of a car navigation system, a high functional safety is required for applications related to the driving control from a view point of securing safety of vehicle driving. Also in this case, as described above, it is possible to realize high functional safety in the semiconductor device 100.

Further, it is possible to mount the semiconductor device 100 described above in a mobile terminal such as a smartphone. For example, in the smartphone, each of an application for transmitting moving image data to TV through WiFi and an application for reproducing a moving image on a panel of the smartphone independently issues an operation request to a video/audio codec IP (Intellectual Property). At this time, even if an operation request is issued from both the applications, arbitration processing can be performed in the hardware IP 11 of the semiconductor device 100.

Second Embodiment

In the first embodiment described above, a semiconductor device is described in which the control receiving units, the number of which is the same as that of the software modules to be executed, are provided. However, in the configuration described above, the greater the number of the software modules, the greater the number of the control receiving units to be provided, so that it causes the semiconductor device (that is, SoC) to be large. On the other hand, in the present embodiment, as a modified example of the semiconductor device 100 according to the first embodiment, a semiconductor device that performs the arbitration processing in the hardware IF while suppressing the number of the control receiving units will be described.

Figure 5:
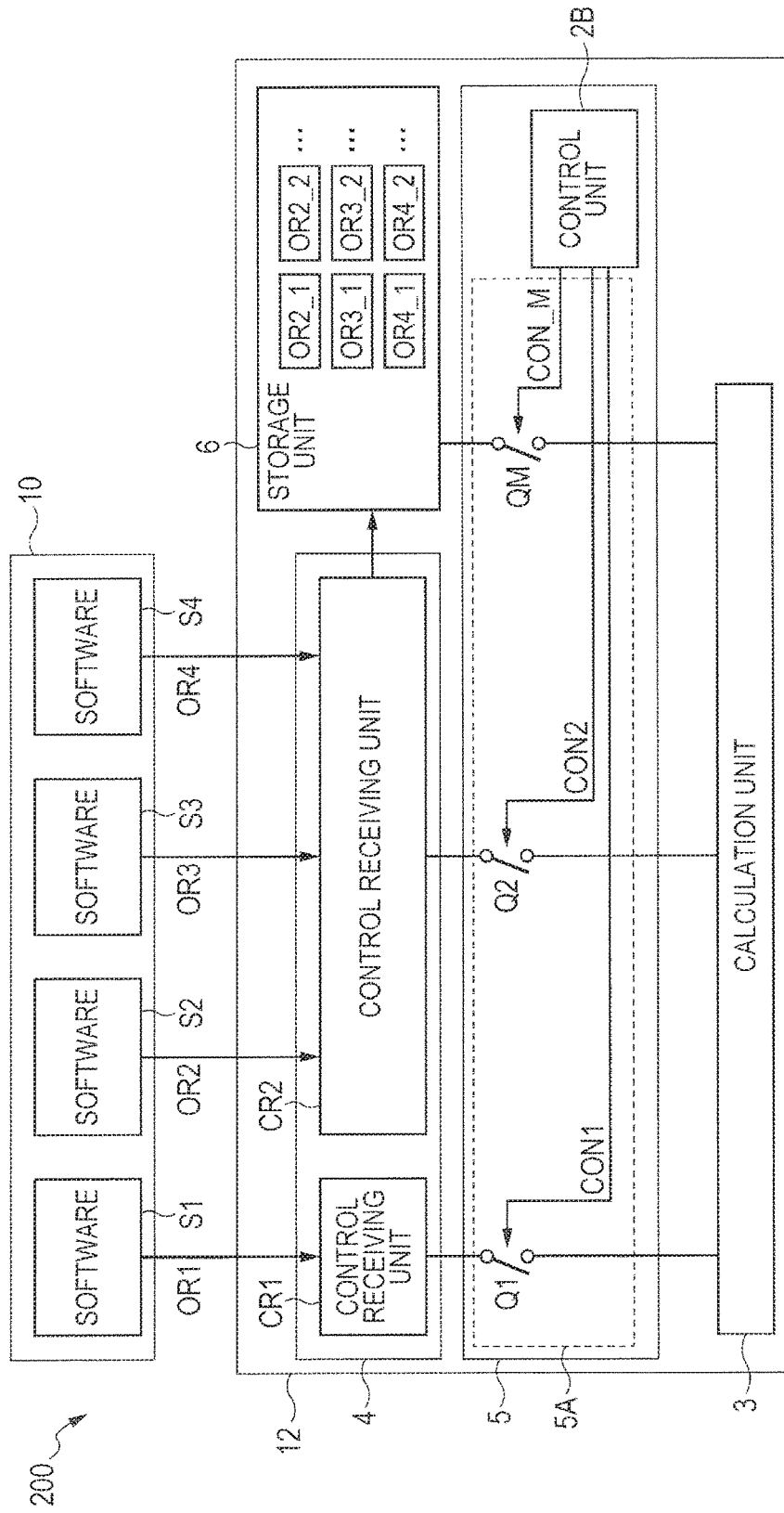
FIG. 5 is a block diagram schematically showing a configuration of a semiconductor device according to a second embodiment.

FIG. 5 is a block diagram schematically showing a configuration of a semiconductor device 200 according to the second embodiment. For simplifying the drawing, an operating system and a bus are not shown in FIG. 5. A hardware IP 12 of the semiconductor device 200 corresponds to the hardware IP 11 of the semiconductor device 100 according to the first embodiment. The hardware IP 12 has a configuration in which the storage unit 1 of the hardware IP 11 according to the first embodiment is replaced by a storage unit 4, the arbitration unit 2 is replaced by an arbitration unit 5, and further a storage unit 6 is added. For clarity of the description, the storage units 1 and 4 are also referred to as a first storage unit and the storage unit 6 is also referred to as a second storage unit. The other configuration of the semiconductor device 200 is the same as that of the semiconductor device 1, so that the description thereof will be omitted.

The storage unit 4 is provided with control receiving units CR1 to CRm (m is an integer that satisfies 2<m<n) that receive operation requests transmitted from the software modules S1 to Sn to be executed. In other words, in the present embodiment, although a plurality of control receiving units are provided, the number of the control receiving units is smaller than that of the software modules. Each of the control receiving units CR1 to CRm receives an operation request from a corresponding software module and transmits information in the control receiving unit to the corresponding software module.

The storage unit 6 may be various types of storage device such as an external memory (DRAM: Dynamic Random Access Memory) and a cache memory. The storage unit 6 sequentially stores operation requests transmitted from a part or all of the control receiving units CR1 to CRm and transits a stored operation request to the control unit 2B according to a request of the control unit 2B.

The arbitration unit 5 has a configuration in which the switching circuit 2A of the arbitration unit 2 is replaced by a switching circuit 5A (also referred to as the first switching circuit). The switching circuit 5A has a configuration in which the switching elements Q3 and Q4 of the switching circuit 2A are deleted and a switching element QM is newly added. The switching element QM may be formed by a transistor such as a MOSFET (Metal-Oxide-Semiconductor Field-Effect Transistor) and a bipolar transistor. The switching element QM is inserted between the storage unit 6 and the calculation unit 3.

The control unit 2B controls open/close (on/off) of the switching elements Q1, Q2, and QM by control signals CON1, CON2, and CON_M. When the switching element QM is MOSFET, the control unit 2B controls open/close (on/off) of the switching element QM by applying a gate voltage (that is, the control signal CON_M) to the gate (control terminal) of the switching elements QM. In the present embodiment, the control unit 2B controls the switching elements Q1, Q2, and QM so that only one of the switching elements Q1, Q2, and QM is closed (becomes on).

A configuration is possible in which the switching element QM described above is not used. In this case, the storage unit 6 transmits a stored operation request to the control unit 2B according to a request of the control unit 2B. The control unit 2B performs control so that only one of the switching elements Q1 and Q2 is closed (becomes on). When the storage unit 4 outputs the stored operation request, the storage unit 4 transmits the operation request to a register corresponding to the operation request to be outputted. When the control unit 2B closes (turns on) switching element (the witching element Q1 or Q2) coupled to the register that has received the operation request, the operation request can be transmitted from the register to the calculation unit 3.

Hereinafter, an operation of the semiconductor device 200 will be described. Here, for simplifying the description, an example will be described in which four software modules S1 to S4 operate and two control receiving units CR1 and CR2 are provided in the semiconductor device 200.

First, the software modules S1 to S4 transmit operation requests OR1 to OR4, respectively, at the same time or at close timings. In this example, the control receiving unit CR1 receives only the operation request OR1 from the software module S1. In other words, the control receiving unit CR1 and the software module S1 have one-to-one correspondence relationship. On the other hand, the control receiving unit CR2 receives the operation requests OR2 to OR4 from the software modules S2 to S4. Then, the control receiving unit CR2 transmits the received operation requests to the storage unit 6. The transmitted operation requests are stored in the storage unit 4. FIG. 5 shows the operation requests stored in the storage unit 6 as OR2_1, OR2_2, . . . , OR3_1, OR3_2, . . . , OR4_1, OR4_2, . . . ). For example, the operation requests stored in the storage unit may be labeled according to a software module of a transmission source (priority may be set between the software modules) or may be labeled according to an order of transmission (priority may be set in order from the operation request transmitted earliest to the operation request transmitted last).

The control receiving unit CR2 stores the received operation requests in the storage unit 6, and thereafter, deletes the stored operation requests from the control receiving unit CR2 and returns to a state in which the control receiving unit CR2 can receive the other operation requests transmitted from the software modules.

Thereby, the control receiving unit CR2 can reduce time for holding the operation requests and receive operation requests transmitted continuously from a plurality of software modules without delay. As a result, it is possible to avoid waiting for transmission of operation requests of the software modules S2 to S4, so that it is possible to improve utilization efficiency of the CPU.

The arbitration unit 5 determines which operation request of the operation requests stored in the control receiving units CR1 and CR2 and the storage unit 6 is to be transferred to the calculation unit 3 according to a set arbitration method. For example, when using round robin as the arbitration method, the arbitration unit 5 selects the transmission source of the operation request by sequentially referring to the control receiving unit CR1, the control receiving unit CR2, and the storage unit 6. When referring to the storage unit 6, the arbitration unit 5 refers to an operation request attached with a label of highest priority.

The arbitration unit 5 performs a control operation in the same manner as in the first embodiment so that the operation request from the selected transmission source is transmitted to the calculation unit 3.

In the above description, the control receiving unit CR1 may sequentially store the received operation requests in the storage unit 6. Thereby, the control receiving unit CR1 can reduce time for holding the operation requests and receive operation requests without delay even when the operation requests are continuously transmitted from the software module S1. As a result, it is possible to avoid waiting for transmission of operation requests of the software module S1, so that it is possible to improve utilization efficiency of the CPU.

In the above description, the control receiving unit CR1 corresponds to only the software module S1. However, the control receiving unit CR1 may correspond to a plurality of software modules.

As described above, according to the present configuration, a part or all of the control receiving units receives operation requests transmitted from a plurality of software modules and thereby it is possible to reduce the number of control receiving units. Thereby, it is advantageous to be able to reduce the size of the semiconductor device.

In the above description, the control receiving unit CR1 corresponds to only the software module S1. When one control receiving unit and one software module correspond one-to-one to each other, there is merit from a viewpoint of functional safety. In other words, when the software module S1 is required to secure high functional safety, it is desirable to assign the dedicated control receiving unit CR1 to the software module S1. Thereby, any other software module does not relate to the information transmission path between the software module S1 and the calculation unit 3. Therefore, it is possible to preliminarily avoid a situation in which the operation request from the software module S1 is obstructed or interrupted by an operation request from a software module other than the software module S1. As a result, it is possible to reliably transmit the operation request from the software module S1, which is highly required to hold functional safety, to the calculation unit 3.

Third Embodiment

Figure 6:
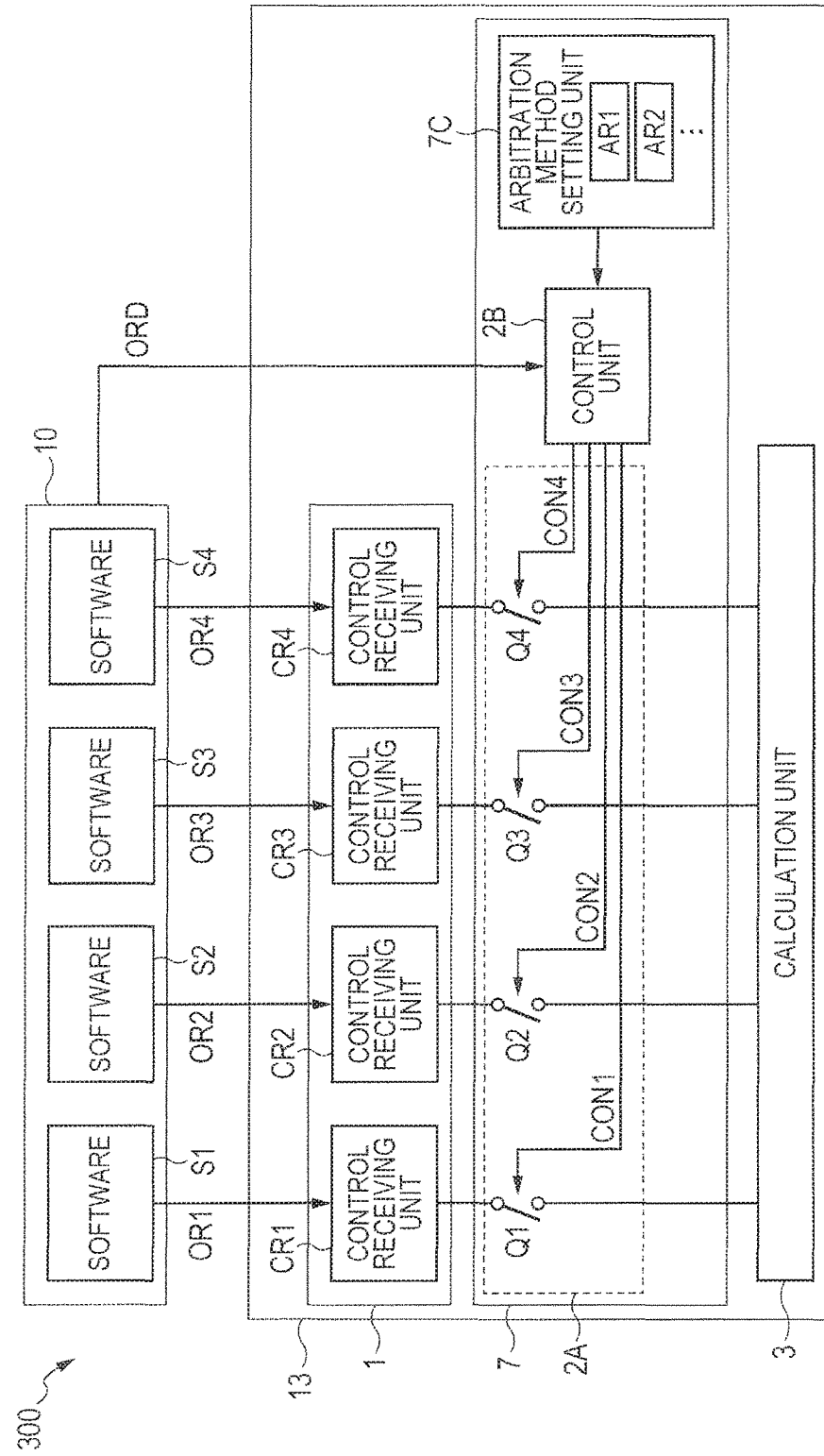
FIG. 6 is a block diagram schematically showing a configuration of a semiconductor device according to a third embodiment.

A semiconductor device according to a third embodiment will be described. A semiconductor device 300 according to the third embodiment is a modified example of the semiconductor device 100 according to the first embodiment. The semiconductor device 300 controls the operation of the arbitration unit based on information transmitted from the calculation unit 3. FIG. 6 is a block diagram schematically showing a configuration of the semiconductor device 300 according to the third embodiment. For simplifying the drawing, an operating system and a bus are not shown in FIG. 6. A hardware IP 13 of the semiconductor device 300 corresponds to the hardware IP 11 of the semiconductor device 100 according to the first embodiment. The hardware IP 13 has a configuration in which the arbitration unit 2 of the hardware IP 11 according to the first embodiment is replaced by an arbitration unit 7.

The arbitration unit 7 has a configuration in which an arbitration method setting unit 7C is added to the arbitration unit 2 according to the first embodiment. The arbitration method setting unit 7C stores a plurality of arbitration methods (AR1, AR2, and so on in FIG. 6) which are used by the control unit 2B to arbitrate the operation requests. The arbitration methods stored in the arbitration method setting unit 7C may be given in advance or may be rewritable from outside the arbitration method setting unit 7C. For example, the control unit 2B reads an arbitration method specified by an order ORD from the CPU 10 (CPU 10_1 to CPU_N) and performs arbitration of the operation requests according to the specific read arbitration method.

Hereinafter, the arbitration operation of the semiconductor device 300 will be specifically described. The semiconductor device 300 performs the arbitration operation of the operation requests in the same manner as the semiconductor device 100 according to the first embodiment. The calculation unit 3 that receives an operation request performs processing according to the operation request and transmits information generated as a result of the processing (for example, a load factor of the calculation unit 3 and a processing completion notification of the calculation unit 3) to a software module which is the transmission source of the operation request (that is, the CPU section 10) in the same manner as in the first embodiment.

In the description of this example, it is assumed the software module S2 is the transmission source of the operation request. In this case, the software module S2 specifies an arbitration method to be used by the control unit 2B based on the information received from the calculation unit 3. For example, when the software module S2 receives information indicating the load factor of the calculation unit 3, if the load factor is smaller than a predetermined value, the round robin is used as the arbitration method, and if the load factor is greater than the predetermined value, a labeled control receiving unit may be selected assuming that a real-time request is high.

For example, when the information from the calculation unit 3 is not transmitted to the software module of the transmission source within a predetermined period of time, an operation request from another software module may be executed by stopping the processing of the calculation unit 3 and issuing an instruction from the CPU to the control unit. Thereby, the operation in the hardware IP is reliably completed within a predetermined period of time, so that it is possible to perform more accurate arbitration operation For example, when an operation request from a specific software module is received by a corresponding control receiving unit, the processing being executed by the calculation unit 3 may be stopped and the operation request from the specific software module may be executed. In this case, the calculation unit 3 autonomously performs reset and thereafter notifies the completion of the reset to the control receiving unit that has transmitted the operation request related to the stopped processing. Thereafter, the operation request from the specific software module is executed. Further, the control receiving unit can set a period of time from when the processing being executed by the calculation unit 3 is stopped to when the operation request from the specific software module is started. Thereby, it is possible to preferentially execute a specific software module when the specific software module is required to secure high functional safety, so that it is possible to perform a more detailed arbitration operation.

Further, the calculation unit 3 may set a period of time from when the processing being executed by the calculation unit 3 is stopped to when the next operation becomes able to be started in the control receiving unit. In this case, by transmitting the set information to the software module, the software module can know the state of the calculation unit 3. Thereby, the software module can perform more flexible control of the hardware IP by changing a processing order of itself and an arbitration method that is set in the arbitration method setting unit.

As described above, it is possible to select an arbitration method suitable for a processing state of the calculation unit by using information that is fed back according to the processing result of the calculation unit. This can be realized without largely changing a hardware configuration the semiconductor device, so that it is possible to effectively use processing resources of the calculation unit.

Fourth Embodiment

Figure 7:
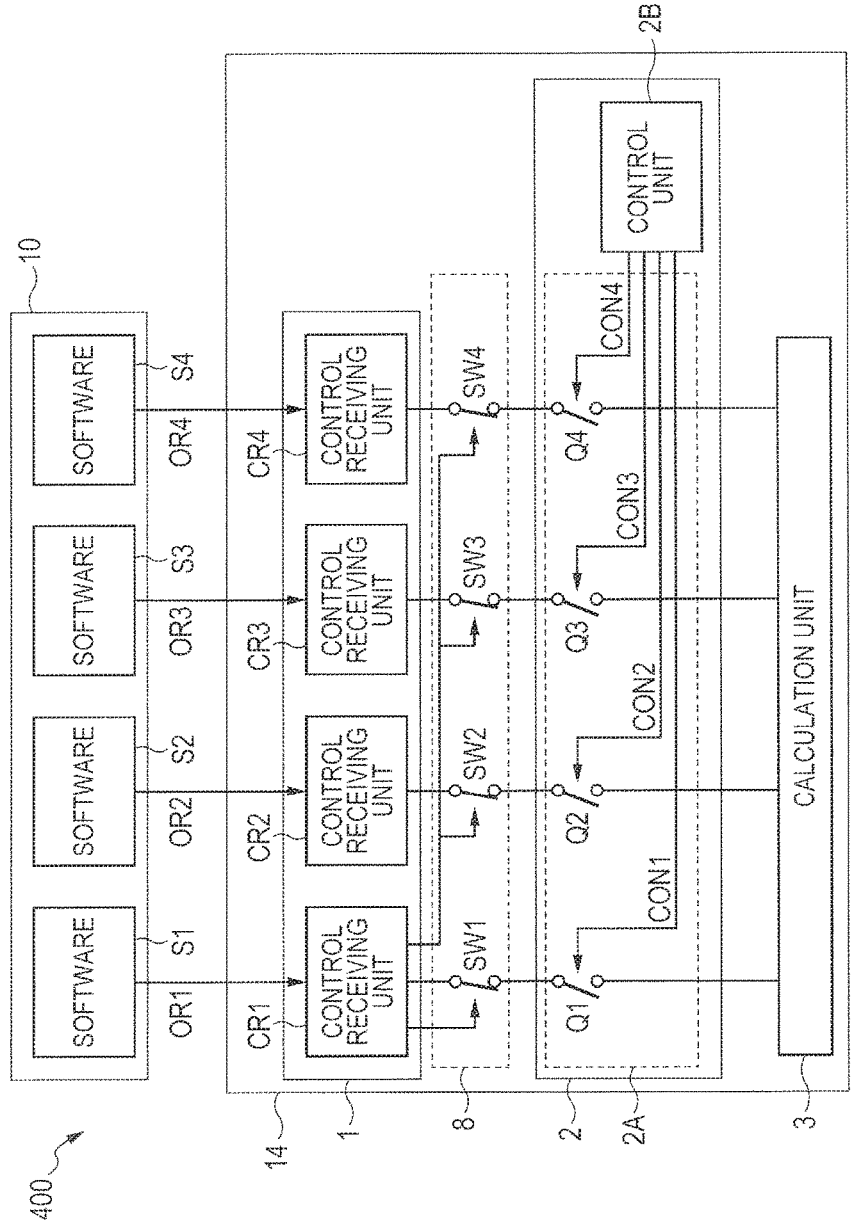
FIG. 7 is a block diagram schematically showing a configuration of a semiconductor device according to a fourth embodiment.

A semiconductor device according to a fourth embodiment will be described. A semiconductor device 400 according to the fourth embodiment is a modified example of the semiconductor device 100 according to the first embodiment. The semiconductor device 400 has a configuration for securing functional safety of a specific software module. FIG. 7 is a block diagram schematically showing a configuration of the semiconductor device 400 according to the fourth embodiment. For simplifying the drawing, an operating system and a bus are not shown in FIG. 7. A hardware IP 14 of the semiconductor device 400 corresponds to the hardware IP 11 of the semiconductor device 100 according to the first embodiment. The hardware IP 14 has a configuration in which a switching circuit 8 (also referred to as a second switching circuit) is added to the hardware IP 11 according to the first embodiment.

The switching circuit 8 has switching elements SW1 to SWn and is inserted between the storage unit 1 and the arbitration unit 2. The switching elements SW1 to SWn are respectively inserted between the control receiving units CR1 to CRn and the arbitration unit 2.

The switching elements SW1 to SWn are opened and closed turned on and off) by control signal (s) from one or a plurality of control receiving units. In the present embodiment, a control receiving unit corresponding to a software module where functional safety is required to be secured is set as a control receiving unit that controls open/close (on/off) of the switching elements SW1 to SWn.

Hereinafter, an operation of the semiconductor device 400 will be described. Here, in the same manner as in the first embodiment, it is assumed that there are four software modules and four control receiving units and the software module S1 corresponding to the control receiving unit CR1 is required to secure functional safety. In this case, the control receiving unit CR1 controls open/close (on/off) of the switching elements SW1 to SW4 of the switching circuit 8. In normal times, as shown in FIG. 7, the switching elements SW1 to SW4 are closed so that an operation request can be transmitted from each control receiving unit.

Figure 8:
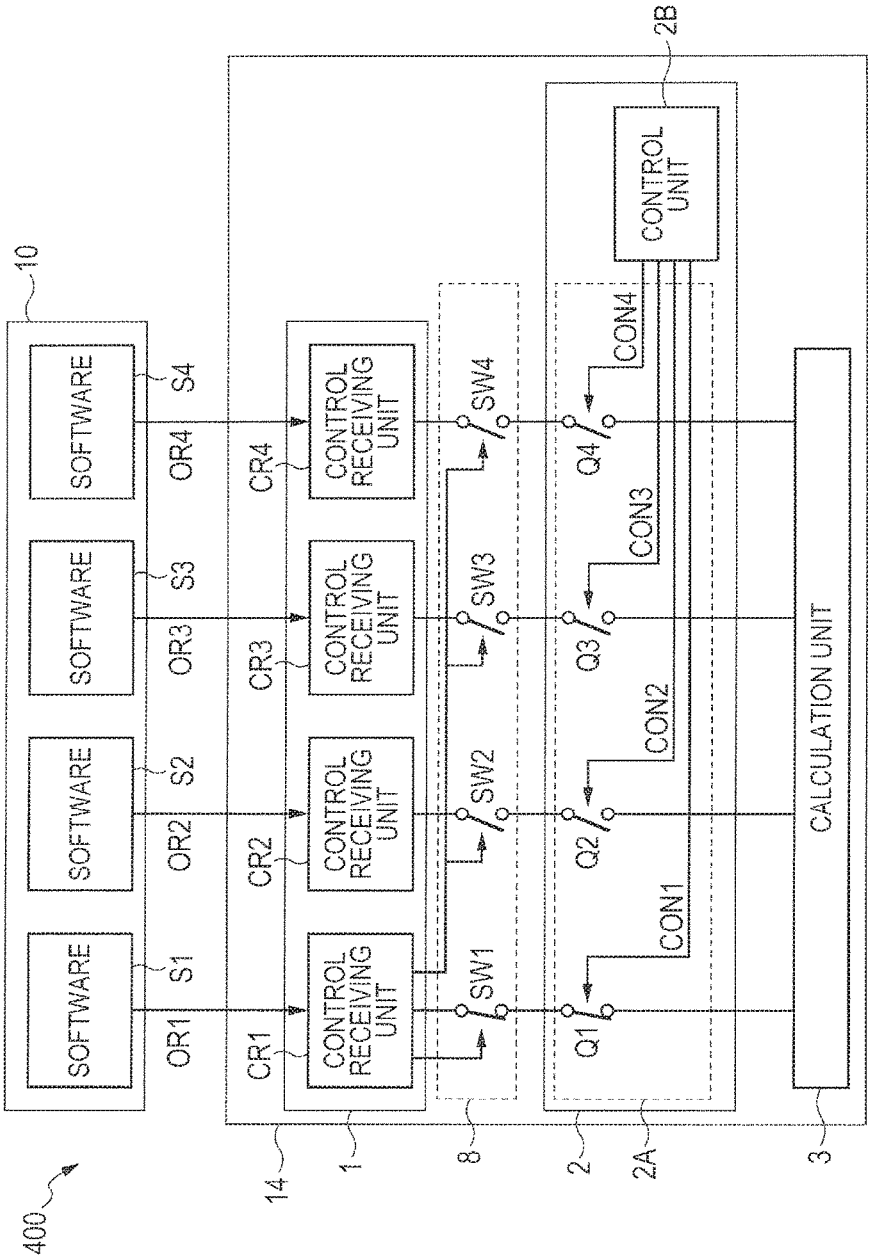
FIG. 8 is a block diagram showing an operation of the semiconductor device according to the fourth embodiment.

In this state, when the operation request OR1 is transmitted from the software module S1 to the control receiving unit CR1, the control receiving unit CR1 opens the switching elements SW2 to SW4 at the same time as receiving the operation request OR1. FIG. 8 is a block diagram showing an operation of the semiconductor device 400 according to the fourth embodiment. For simplifying the drawing, an operating system and a bus are not shown in FIG. 8. As shown in FIG. 8, an operation request from the control receiving units CR2 to CR4 other than the control receiving unit CR1 is prevented from being transmitted. In a state shown in FIG. 8, the operation request CR1 is transmitted to the calculation unit 3, so that the switching element Q1 is closed. Thereby, the operation request OR1 from the software module S1 is reliably and preferentially executed without being interrupted by another operation request, so that it is possible to satisfy functional safety request for the software module S1.

The switching circuit 8 may further include four switching elements (second switching elements) respectively inserted between the software modules S1 to S4 and the control receiving units CR1 to CR4. At the same time as receiving the operation request OR1, the control receiving unit CR1 may close one of the four switching elements, which is coupled to the control receiving unit CR1, and open the other switching elements which are coupled to the control receiving units CR2 to CR4.

Other Embodiments

The present invention is not limited to the above embodiments and may be appropriately modified without departing from the scope of the invention. For example, in the above embodiments, for simplifying the description, specific examples in which four software modules operate are described. However, it goes without saying that it is possible to form a semiconductor device in which two, three, or five or more software modules operate and control receiving units corresponding to these software modules are provided.

Also in the semiconductor device 300 according to the third embodiment described above, in the same manner as in the semiconductor device 200 according to the second embodiment, it is needless to say that a configuration can be formed in which the number of the control receiving units is smaller than the number of the software modules and the storage unit 6 is provided to sequentially store the operation requests from the control receiving units.

Also in the semiconductor device 400 according to the fourth embodiment described above, in the same manner as in the semiconductor device 200 according to the second embodiment, it is needless to say that a configuration may be formed in which the number of the control receiving units is smaller than the number of the software modules and the storage unit 6 is provided to sequentially store the operation requests from the control receiving units. Also in the semiconductor device 400 according to the fourth embodiment described above, in the same manner as in the semiconductor device 300 according to the third embodiment, it is needless to say that a configuration may be formed in which the arbitration method setting unit is provided to change the arbitration method to be used by the control unit 2B based on the information transmitted from the calculation unit 3. Also in the semiconductor device 400 according to the fourth embodiment described above, it is needless to say that a configuration may be formed in which the number of the control receiving units is smaller than the number of the software modules and the storage unit 6 is provided to sequentially store the operation requests from the control receiving units in the same manner as in the semiconductor device 200 according to the second embodiment and the arbitration method setting unit is provided to change the arbitration method to be used by the control unit 2B based on the information transmitted from the calculation unit 3 in the same manner as in the semiconductor device 300 according to the third embodiment.

To clarify the description, the above description and the drawings are appropriately omitted and simplified. The components shown in the drawings as functional blocks that perform various processing can be formed by a CPU, a memory, and other circuits as hardware and are realized by a program and the like loaded in a memory as software. Therefore, it should be understood by those skilled in the art that the functional blocks can be realized in various forms by only hardware, only software, or a combination of these, and the functional blocks are not limited to any one of hardware, software, and a combination of these. In each drawing, the same components are denoted by the same reference symbols and redundant description is omitted as appropriate.

The program described above is stored in various types of non-transitory computer readable medium and can be supplied to a computer. The non-transitory computer readable media include various types of tangible storage media. Examples of the non-transitory computer readable medium include a magnetic recording medium (for example, flexible disk, magnetic tape, and hard disk drive), a magneto-optical recording medium (for example, magneto-optical disk), a CD-ROM (Read Only Memory), a CD-R, a CD-R/W, a semiconductor memory (for example, mask ROM, PROM (Programmable ROM), EPROM (Erasable PROM), flash ROM, RAM (Random Access Memory)). The program may be supplied to a computer by various types of transitory computer readable medium. Examples of the non-transitory computer readable medium include an electrical signal, an optical signal, and an electromagnetic wave. The non-transitory computer readable medium can supply the program to a computer through a wired communication path such as an electrical wire and an optical fiber or a wireless communication path.

In the description of the above embodiments, the switching circuits (the first and the second switching circuits) are formed by a single switching element realized by MOSFET or the like. However, this is just an example. It is needless to say that if it is possible to control exchange of information between the storage units (the first and the second storage units) and the calculation unit in the same manner as in the embodiments described above, the switching circuits may have another configuration. In this case, the number of the switching elements provided in the switching circuit is not limited to that in the examples of the embodiments described above, and elements other than the switching elements may be included. Further, the switching circuit may be formed by using one or a plurality of logical circuits.

While the invention made by the inventors has been specifically described based on the embodiments, it is needless to say that the present invention is not limited to the embodiments described above and may be variously modified without departing from the scope of the invention.

What is claimed is:

1. A semiconductor device comprising:
   a CPU section configured to execute a plurality of software modules; and
   a hardware IP configured to perform processing based on operation requests transmitted by the CPU section,
   wherein the hardware IP includes
      a first storage unit including a plurality of control receiving units configured to receive the operation requests transmitted by respective ones of the software modules,
      a calculation unit configured to perform processing based on the operation requests transmitted from the control receiving units to generate response information, and
      an arbitration unit configured to control information transmission between the control receiving units and the calculation unit such that the calculation unit receives only one of the operation requests at a time from any one of the control receiving units, and
   wherein, while forming a first information transmission path between the calculation unit and one of the control receiving units, the arbitration unit transmits the operation request output from the one of the control receiving units to the calculation unit and transmits the response information generated based on the transmitted operation request from the calculation unit to the one of the control receiving units.

2. The semiconductor device according to claim 1, wherein the arbitration unit is further configured to select a control receiving unit to be a transmission source of an operation request to be received by the calculation unit according to a set arbitration method.

3. The semiconductor device according to claim 2, wherein the arbitration unit includes
   a first switching circuit including a plurality of switching elements inserted between each of the control receiving units and the calculation unit in parallel, and
   a control unit configured to control opening and closing of the switching elements, and
   wherein the arbitration unit is further configured to close one of the switching elements coupled to the selected control receiving unit and to open other switching elements, of the switching elements, coupled to the control receiving units other than the selected control receiving unit.

4. The semiconductor device according to claim 1,
wherein the control receiving units, the number of which is the same as that of the software modules, are provided, and
wherein the control receiving units are configured to receive operation requests from different software modules, respectively.

5. The semiconductor device according to claim 1, further comprising:
a second storage unit configured to be able to store one or a plurality of operation requests,
wherein the number of the control receiving units is smaller than the number of the software modules,
wherein a part or all of the control receiving units are configured to receive operation requests from two or more software modules,
wherein a control receiving unit, of the control receiving units, is configured to receive operation requests from two or more software modules and to store the received operation requests sequentially in the second storage unit, and
wherein the arbitration unit is further configured to control information transmission between the calculation unit and any one of the control receiving units and the second storage unit such that the calculation unit receives only ones of operation requests, of the operation requests, from any one of the control receiving units and the second storage unit.

6. The semiconductor device according to claim 5,
wherein a part or all of the control receiving units are configured to receive only the ones of the operation requests from respective ones of the software modules, and
wherein a control receiving unit, of the control receiving units, is configured to store a respective one of the operation requests in the second storage unit.

7. The semiconductor device according to claim 5,
wherein the control receiving unit is further configured to delete the stored, respective one of the operation requests from the control receiving unit and to return to a state in which the control receiving unit can receive other operation requests.

8. The semiconductor device according to claim 1,
wherein the arbitration unit includes an arbitration method setting unit in which a plurality of arbitration methods are stored,
wherein the CPU section is further configured to specify an arbitration method to be used by the arbitration unit based on the response information, and
wherein the arbitration unit is further configured to acquire an arbitration method corresponding to the specification from the arbitration method setting unit.

9. The semiconductor device according to claim 1, further comprising:
a second switching circuit including a plurality of first switching elements inserted between each of the control receiving units other than a specific control receiving unit and the arbitration unit in parallel,
wherein the specific control receiving unit and the first switching elements are configured such that when the specific control receiving unit receives a first operation request of the operation requests, the first switching elements are opened.

10. The semiconductor device according to claim 9,
wherein the specific control receiving unit is further configured to control opening and closing of the switching elements of the second switching circuit, and
wherein the specific control receiving unit and the first switching elements are further configured such that when the specific control receiving unit receives second operation request of the operation requests, the specific control receiving unit opens the first switching elements.

11. The semiconductor device according to claim 9,
wherein the second switching circuit further includes a plurality of second switching elements inserted between each of the control receiving units other than the specific control receiving unit and the CPU section in parallel, and
wherein the specific control receiving unit and the second switching elements are configured such that when the specific control receiving unit receives a second operation request, the second switching elements are opened.

12. The semiconductor device according to claim 11,
wherein the specific control receiving unit is further configured to control opening and closing of the second switching elements, and
wherein the specific control receiving unit and the second switching elements are further configured such that when the specific control receiving unit receives the second operation request, the specific control receiving unit opens the second switching elements.

13. The semiconductor device according to claim 5, wherein the operation requests stored in the second storage unit are attached with a label of priority of transmission to the calculation unit according to a predetermined rule, and when the arbitration unit controls the information transmission between the second storage unit and the calculation unit, the arbitration unit refers to the operation request based on the label of highest priority.

14. The semiconductor device according to claim 1, wherein when the response information is not transmitted via the first information transmission path within a predetermined period of time, the calculation unit stops generating the response information based on the transmitted operation request via the first information transmission path.

15. The semiconductor device according to claim 14, wherein, after the calculation unit stops generating the response information, the arbitration unit switches an information transmission path from the first information transmission path to a second information transmission path that is formed between the calculation unit and one of the other control receiving units.

16. The semiconductor device according to claim 1, wherein when one of the other control receiving units receives the operation request from a specific software module, the calculation unit stops generating the response information based on the transmitted operation request via the first information transmission path.

17. The semiconductor device according to claim 16, wherein when stopping generating the response information, the calculation unit performs reset and notifies a completion of the reset to the one of the control receiving unit via the first information transmission path.

18. The semiconductor device according to claim 1, wherein the response information comprises information indicating a load factor of the calculation unit, wherein the CPU section compares the load factor with a predetermined value to decide an arbitration method, and specifies the decided arbitration method to be used by the arbitration unit, and wherein the arbitration unit performs a switch of information transmission paths between the calculation unit and any one of the control receiving units according to the specified arbitration method.

19. The semiconductor device according to claim 1, further comprising a second storage unit coupled to the first storage unit and the arbitration unit, wherein the first storage unit transmits the received operation requests to the second storage unit, wherein the arbitration unit controls information transmission between the calculation unit and any one of the control receiving units and the second storage unit such that the calculation unit receives only one of the operation requests at a time from any one of the control receiving units and the second storage unit, wherein the operation requests transmitted to the second storage unit are stored in labeled, respectively, and wherein, when reading any one of the stored operation requests from the second storage unit, the arbitration unit selects the operation request to be read by deciding a priority based on the labels.

20. The semiconductor device according to claim 19, wherein the labeling of the operation requests stored in the second storage unit is performed according to the software modules of a transmission source.

21. The semiconductor device according to claim 19, wherein the labeling of the operation requests stored in the second storage unit is performed according to an order of transmission from the first storage unit to the second storage unit.

* * * * *